(12) United States Patent
Pham

(10) Patent No.: US 9,544,360 B2
(45) Date of Patent: Jan. 10, 2017

(54) SERVER-BASED SYSTEM, METHOD, AND COMPUTER PROGRAM PRODUCT FOR SCANNING DATA ON A CLIENT USING ONLY A SUBSET OF THE DATA

(71) Applicant: McAfee, Inc., Santa Clara, CA (US)

(72) Inventor: Khai N. Pham, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/337,421

(22) Filed: Jul. 22, 2014

(65) Prior Publication Data

US 2015/0019632 A1 Jan. 15, 2015

Related U.S. Application Data

(63) Continuation of application No. 12/251,112, filed on Oct. 14, 2008, now Pat. No. 8,799,450.

(51) Int. Cl.
| | |
|---|---|
| G06F 15/16 | (2006.01) |
| H04L 29/08 | (2006.01) |
| G06F 21/56 | (2013.01) |
| H04W 12/12 | (2009.01) |
| G06F 17/30 | (2006.01) |
| G06F 21/52 | (2013.01) |
| G06F 21/51 | (2013.01) |
| H04L 29/06 | (2006.01) |

(52) U.S. Cl.
CPC ......... *H04L 67/10* (2013.01); *G06F 17/30312* (2013.01); *G06F 21/56* (2013.01); *H04W 12/12* (2013.01); *G06F 21/51* (2013.01); *G06F 21/52* (2013.01); *H04L 63/1441* (2013.01)

(58) Field of Classification Search
CPC ...... H04L 67/10; H04L 63/1441; G06F 21/52; G06F 21/51; G06F 21/56; G06F 17/30312; H04W 12/12
USPC ................... 709/203, 224; 726/24; 713/188
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,357,004 B1 | 3/2002 | Davis |
| 6,460,050 B1 | 10/2002 | Pace et al. |
| 6,963,978 B1 | 11/2005 | Muttik et al. |
| 7,353,257 B2 | 4/2008 | Pettigrew et al. |
| 7,376,842 B1 | 5/2008 | Hursey |
| 7,409,719 B2 | 8/2008 | Armstrong et al. |
| 7,506,155 B1 | 3/2009 | Stewart et al. |
| 7,565,550 B2 | 7/2009 | Liang et al. |
| 7,945,955 B2 | 5/2011 | Katkar |
| 8,230,510 B1 | 7/2012 | Yang et al. |

(Continued)

OTHER PUBLICATIONS

USPTO Oct. 28, 2010 Nonfinal Office Action from U.S. Appl. No. 12/251,112.

(Continued)

*Primary Examiner* — Jungwon Chang
(74) *Attorney, Agent, or Firm* — Patent Capital Group

(57) ABSTRACT

A server-based system, method, and computer program product are provided for scanning data on a client using only a subset of the data. In operation, a request is received for a subset of data stored on a client that is required for determining whether the data is unwanted. Additionally, a representation of only the subset of data is sent from the client to a server over a network. Furthermore, a response is received from the server over the network. Still yet, there is a reaction based on the response.

18 Claims, 7 Drawing Sheets

(56) References Cited

U.S. PATENT DOCUMENTS

| | | | |
|---|---|---|---|
| 8,353,041 | B2 | 1/2013 | Brown et al. |
| 8,799,450 | B2 | 8/2014 | Pham |
| 2005/0132206 | A1 | 6/2005 | Palliyil et al. |
| 2007/0067359 | A1 | 3/2007 | Barrs et al. |
| 2008/0195676 | A1 | 8/2008 | Lyon et al. |
| 2010/0115619 | A1 | 5/2010 | Burtscher |
| 2015/0019631 | A1 | 1/2015 | Pham et al. |

OTHER PUBLICATIONS

USPTO Jul. 18, 2011 Final Office Action from U.S. Appl. No. 12/251,112.
USPTO Feb. 8, 2012 Nonfinal Office Action from U.S. Appl. No. 12/251,112.
USPTO Jul. 9, 2012 Final Office Action from U.S. Appl. No. 12/251,112.
USPTO Dec. 21, 2012 Nonfinal Office Action from U.S. Appl. No. 12/251,112.
USPTO Apr. 18, 2013 Final Office Action from U.S. Appl. No. 12/251,112.
USPTO Aug. 8, 2013 Advisory Action to AFCP Response to Apr. 18, 2013 Final Office Action from U.S. Appl. No. 12/251,112.
USPTO Oct. 22, 2013 Nonfinal Rejection from U.S. Appl. No. 12/251,112.
USPTO Mar. 20, 2014 Notice of Allowance from U.S. Appl. No. 12/251,112.
"Is LiveUpdate Notice a Symantec product?", May 20, 2008, Internet Archive Wayback Machine, 3 pages.
"Why App Protection? Security for the Application Perimeter, Guarding Technology" Arxan, Aug. 25, 2012, Internet Archive Wayback Machine, 2 pages.
"Irdeto ActiveCloak™ Media, Core Technology, The Key to Effective Content Protection," Jun. 25, 2014, 6 pages.
Arxan Mobile Application Protection Handbook, Arxan Technologies, Inc., Aug. 13, 2014, 18 pages.
USPTO Jun. 1, 2015 Nonfinal Rejection from U.S. Appl. No. 14/337,360, 17 pages.
USPTO Dec. 14, 2015 Final Rejection from U.S. Appl. No. 14/337,360, 9 pages.
USPTO Mar. 2, 2016 Advisory Action from U.S. Appl. No. 14/337,360, 6 pages.
USPTO Jun. 21, 2016 Nonfinal Rejection from U.S. Appl. No. 14/337,360, 15 pages.

300

CLASS 1

SIGNATURE_1 RETRIEVAL INSTRUCTIONS_1
SIGNATURE_2 IDENTIFICATION INFORMATION_1
SIGNATURE_3

CLASS 2

SIGNATURE_4 RETRIEVAL INSTRUCTIONS_2
SIGNATURE_5 IDENTIFICATION INFORMATION_2
SIGNATURE_6

SERVER-BASED SYSTEM, METHOD, AND COMPUTER PROGRAM PRODUCT FOR SCANNING DATA ON A CLIENT USING ONLY A SUBSET OF THE DATA

CROSS-REFERENCE TO RELATED APPLICATIONS

This Application is a divisional (and claims the benefit of priority under 35 U.S.C. §120 and §121) of U.S. application Serial No. 12/251,112, filed Oct. 14, 2008, entitled "SERVER-BASED SYSTEM, METHOD, AND COMPUTER PROGRAM PRODUCT FOR SCANNING DATA ON A CLIENT USING ONLY A SUBSET OF THE DATA", and naming Khai N. Pham as inventor. The disclosure of the prior Application is considered part of and is hereby incorporated by reference in its entirety in the disclosure of this Application.

FIELD OF THE INVENTION

The present invention relates to remote data analysis, and more particularly to identifying unwanted data over a network.

BACKGROUND

Currently, mobile communication and computing devices are not as effective as larger computing systems in providing effective dynamic protection against the ever-changing and ever-pervasive malware scene, despite technology advancements in processor speed, memory size, and communications bandwidth. These limitations prevent timely identification of, and remediation against, software attacks in this mobile computing and communications platform.

Identification of viruses, spyware, bots, and other malware residing in memory and in storage on devices is often implemented by performing a comparison of a characteristic signature of the malware against a list of known malware. Scanning for the signature (e.g. in an anti-virus scanning process, etc.) utilizes a large amount of processing time due to the complexities and large numbers of malware signatures present today. Further, and equally formidable, is the size of the data file containing those known signatures and the frequency of their update, such that downloading a large signature file (e.g. 30 MB in size, etc.) may present a perceptible and disruptive impact on the normal operation of the mobile device.

The update frequency of these updated signature data files, and the corresponding repeated downloading of them to the mobile devices in the field, presents a near-crippling impact on the functionality of the mobile device and a near-total consumption of network bandwidth to a wireless device. The net effect is that mobile computing and communications device users must either live with significant impact to their operation with these devices, or go without the latest and most recent signature of potentially devastating malware. Neither condition is acceptable in a business environment. There is thus a need for overcoming these and/or other issues associated with the prior art.

SUMMARY

A server-based system, method, and computer program product are provided for scanning data on a client using only a subset of the data. In operation, a request is received for a subset of data stored on a client that is required for determining whether the data is unwanted. Additionally, a representation of only the subset of data is sent from the client to a server over a network. Furthermore, a response is received from the server over the network. Still yet, there is a reaction based on the response.

BRIEF DESCRIPTION OF THE DRAWINGS

FIG. 3 shows a data structure capable of being utilized to request a subset of data stored on a client, in accordance with one embodiment.

DETAILED DESCRIPTION

Figure 1:
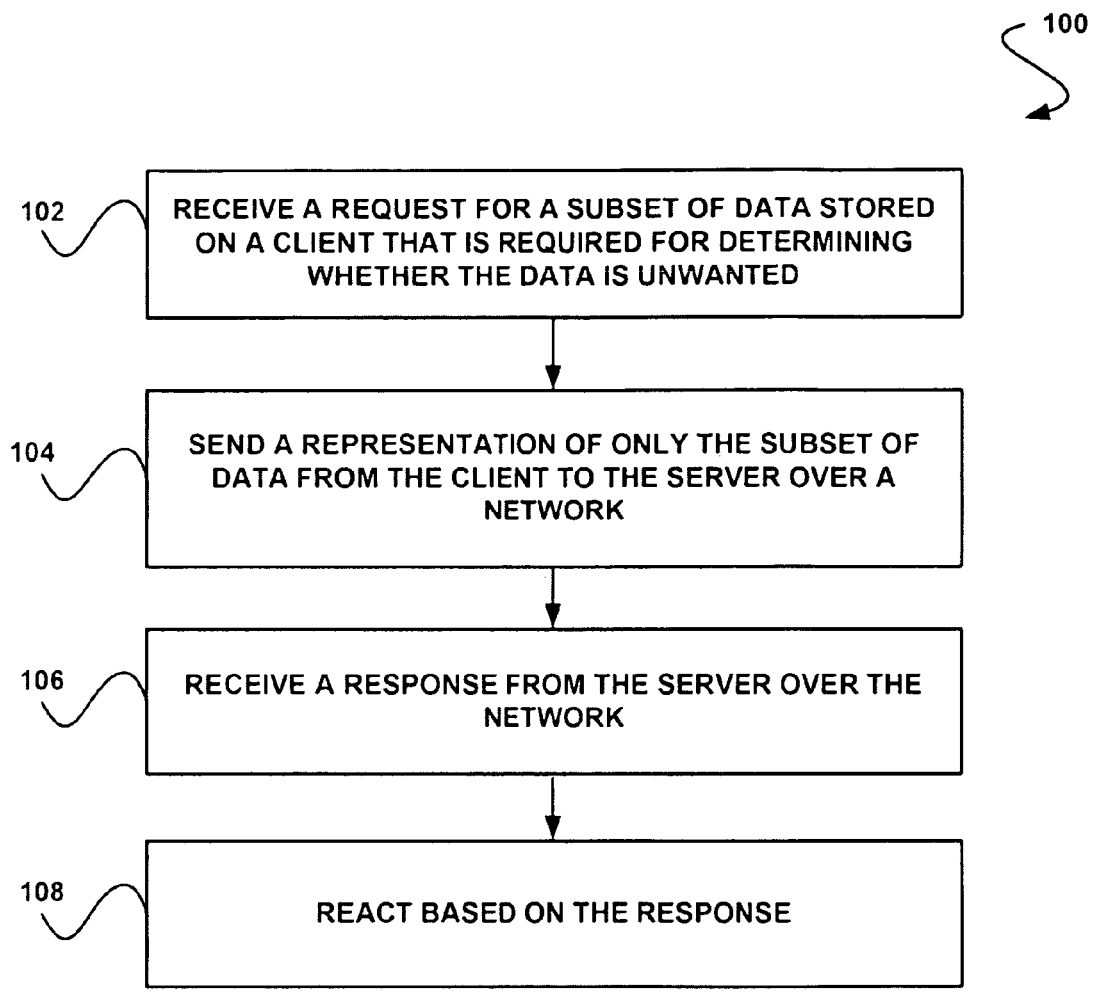
FIG. 1 shows a method for scanning data on a client using only a subset of the data, in accordance with one embodiment.

FIG. 1 shows a method 100 for scanning data on a client using only a subset of the data, in accordance with one embodiment. As shown, a request is received for a subset of data stored on a client that is required for determining whether the data is unwanted. See operation 102.

In the context of the present description, a client refers to any client device capable of communicating with another device (e.g. a server system, etc.). For example, in various embodiments, the client may include a desktop computer, lap-top computer, hand-held computer, mobile device (e.g. a mobile phone, etc.), personal digital assistant (FDA), peripheral (e.g. printer, etc.), any component of a computer, and/or any other type of logic. Furthermore, the data may include any data capable of being stored on a client. For example, in various embodiments, the data may include documents, files, software applications, computer code, and/or any other data that meets the above definition.

Once the request for the subset of data is received, a representation of only the subset of data is sent from the client to a server over a network. See operation 104. The representation of the subset of the data may include any item capable of representing the subset of data.

For example, in one embodiment, the representation of the subset of data may include the actual subset of data. In another embodiment, the representation of the subset of data may include a hash of the subset of data. In still another embodiment, the representation may include identification information that identifies the subset of data. In this case, the identification may be sent together with the subset of data or with the hash of the subset of data.

Once the representation of the subset of data is sent from the client to the server, a response is received from the server over the network. See operation 106. Furthermore, there is a reaction based on the response. See operation 108.

The reaction may include various actions. For example, in one embodiment, the reaction may include a predetermined action. In this case, the predetermined action may be user defined. As an option, the predetermined action may include an action based on a policy setting.

In various embodiments, the reaction may include deleting the data, deleting an application associated with the data, restarting an application associated with the data, disabling an I/O port (e.g. a USB port, etc.), resetting the client device, automatically shutting down the client device, preventing further operation of the client device, and/or any other action. Additionally, in one embodiment, the reaction may include the server sending a new, uninfected file or application associated with the data to the client device. In this case, the new file or application may be automatically installed on the client device.

More illustrative information will now be set forth regarding various optional architectures and features with which .the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
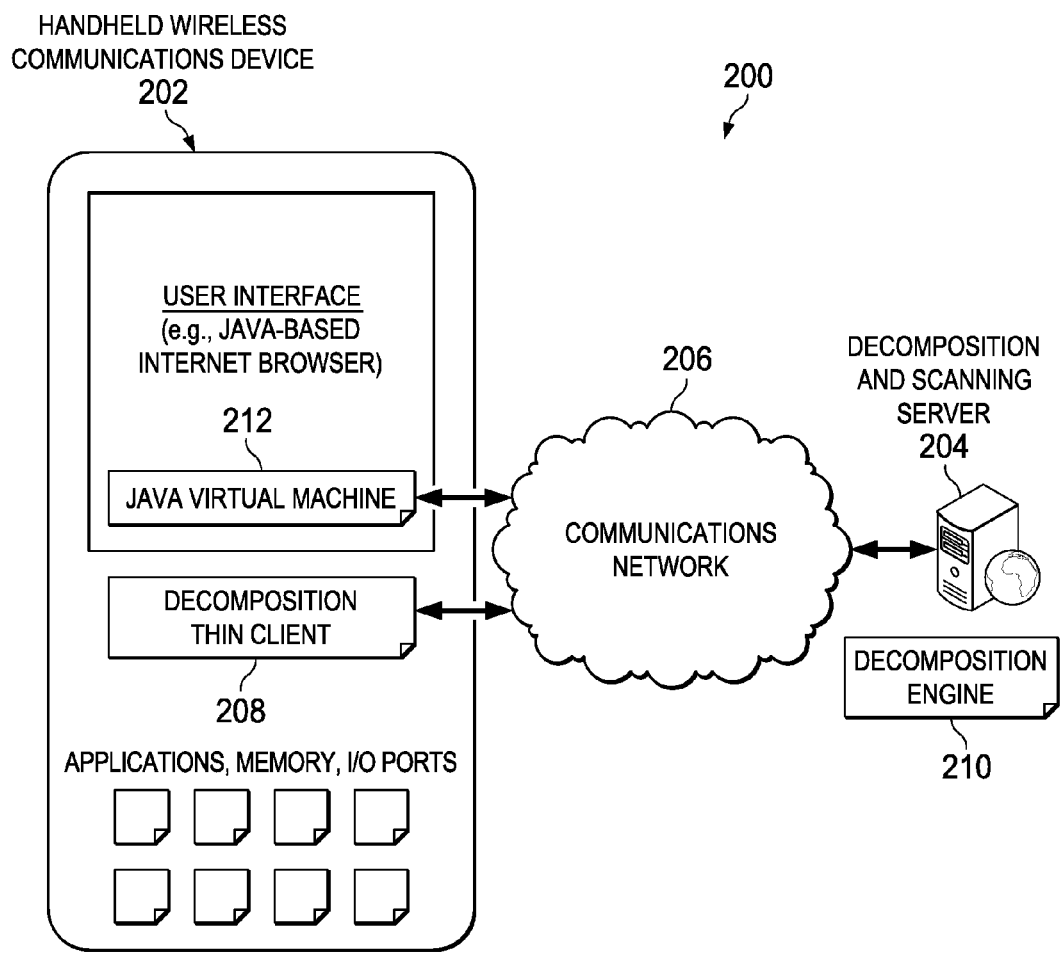
FIG. 2 shows a system for scanning data on a client using only a subset of the data, in accordance with one embodiment.

FIG. 2 shows a system 200 for scanning data on a client using only a subset of the data, in accordance with one embodiment. As an option, the system 200 may be implemented in the context of the environment of FIG. 1. Of course, however, the method 200 may be implemented in any desired environment. It should also be noted that the aforementioned definitions may apply during the present description.

As shown, a client device 202 is provided. Although, the client device 202 is illustrated as a mobile wireless communication device, in another embodiment, the client device 202 may include various client devices. For example, the client device 202 may include a fixed device as opposed to a mobile device.

The client device 202 is in communication with a server 204 over a network 206. In this case, the network 206 includes a wireless network. In various other embodiments, the network may take any form including a local area network (LAN), a wide area network (WAN) such as the Internet, peer-to-peer network, etc.

In operation, a client-side software module 208 (e.g. a decomposition thin client) may identify and send data such as a file, memory structure, or data associated with an input/output (I/O) port to the server 204 over the wireless network 206. In this case the data may include data that potentially contains a virus, spyware, and/or any other malware. The server 204 may then receive and scan the data by comparing bit patterns in the data against known-malicious patterns included in current malware signature files (e.g. from a security research partner, etc.) stored on the server 204.

In the event of a positive match against the signature file and/or against any other behavior-based characterization of known malware operation, the server 204 may reply to the handheld client device 202 in a manner that instructs the client device 202 to react. For example, the server 204 may send instructions to the client device 204 to perform a predetermined operation based on a policy setting of an administrator.

In this case, the administrator may be an administrator for a communications system associated with the client device 202, an enterprise company supporting the client device 202, or a company sponsoring the use of the client device 202, etc. In various embodiments, the policy actions may include, but are not limited to, deleting an application in use on a mobile platform of the client device 202, restarting an application, closing down an I/O port in question, resetting the client device 202, automatically shutting down the client device 202, and/or preventing the client device 202 from any further operation.

As an option, the server 204 may send a new, uninfected file or application to the client device 202 as part of the reaction. The uninfected file or application may be configured to be automatically installed on the client device 202. Regardless of the specific reaction, the client device 202 may be cleansed and/or prevented from further operation with the malware being present.

In the event that, through scanning/comparison actions performed on the server 204, no malware is found to be present in the data sent by the client device 202 to the server 204, the server 204 may reply with a signal to the client device 202 indicating that operations may continue unimpeded. In this case, the signal may include a notification to a user of the client device 202. As another option, the signal may include an enabling signal capable of automatically enabling functionality of the client device 202.

As part of identifying data to send to the server 204, decomposition may be performed on the client device 202. By performing decomposition on the client device 202, data such as a file, a memory segment, or data associated with an I/O port that potentially contains evidence of malware resident on the platform may be isolated. This decomposed subset of the software or data running on the client device 202 may then be sent to the server 204 for subsequent high-performance analysis.

Decomposition boundaries, or limits, may be determined utilizing various techniques. In one embodiment, the client-side software module 208 (e.g. the decomposition thin client) running on the client device 202 may be utilized. In this case, the client-side software module 208 may be installed on the client device 202 before the device is given to a user by an IT department or system administrator, for example.

In one embodiment, the client-side software module 208 may be configured to communicate with a server decomposition engine 210 (e.g. a software application) located on the server 204. The client-side software module 208 may further be configured to accept commands from the server decomposition engine 210 such that the decomposition boundaries are sent by the server 204 and received by the client-side software module 208 located on the client device 202. The server decomposition engine 210 may instruct the client-side software module 208 to collect and send the prescribed data to the server 204 for analysis.

In another embodiment, a Java-based browser (e.g. Safari, etc.) on the client device 202 may include a Java Virtual Machine (JVM) 212 which is natively designed to accept commands from a remote host server and perform the requested functions. One of the functions may be to send specified files and memory to the requesting server. This JVM 212 may be configured such that the server decomposition engine 210 may instruct the JVM 212 to collect and send the prescribed data to the server 204 for analysis.

Using this system 200, anti-virus scanning and decision making functions may be transferred from the resource-limited platform of the client handheld mobile device 202 to a more powerful and conventional remote computer designed to operate in a client-server manner with the client handheld device 202. In this way, the security-intensive operations of security scanning and remediation may be offloaded to a more powerful computer that is better suited to handle the large and dynamically-changing virus signature files. Thus, despite size or performance limitations, a mobile handheld computing/communication device may effectively be scanned in real-time, either with a dedicated decomposition application or with a JVM-enabled Internet browser, for the presence of the latest malware, and may be remediated with policy-based actions under the control of a system administrator.

FIG. 3 shows a data structure 300 capable of being utilized to request a subset of data stored on a client, in accordance with one embodiment. As an option, the data structure 300 may be viewed in the context of the architecture and environment of FIGS. 1-2. Of course, however, the data structure 300 may be viewed in the context of any desired environment. Again, the aforementioned definitions may apply during the present description.

In one embodiment, the data structure 300 may be stored on a server and be utilized to request a subset of data stored on a client that is required for determining whether the data is unwanted. As shown, the data structure 300 may define a plurality of classes of data (e.g. malware, etc.). Furthermore, each of the classes of data may include one or more signatures associated with malicious code. Additionally, each class may include a set of identification and retrieval instructions that may be used to identify and retrieve a subset of data on the client device, the subset of data including data that corresponds to the signatures in that class.

In one embodiment, the identification information included in each class may correspond to identification information of hashed data provided by the client. For example, the server may request a subset of data from the client. The client may then perform a hashing operation on data stored on the client.

Figure 4:
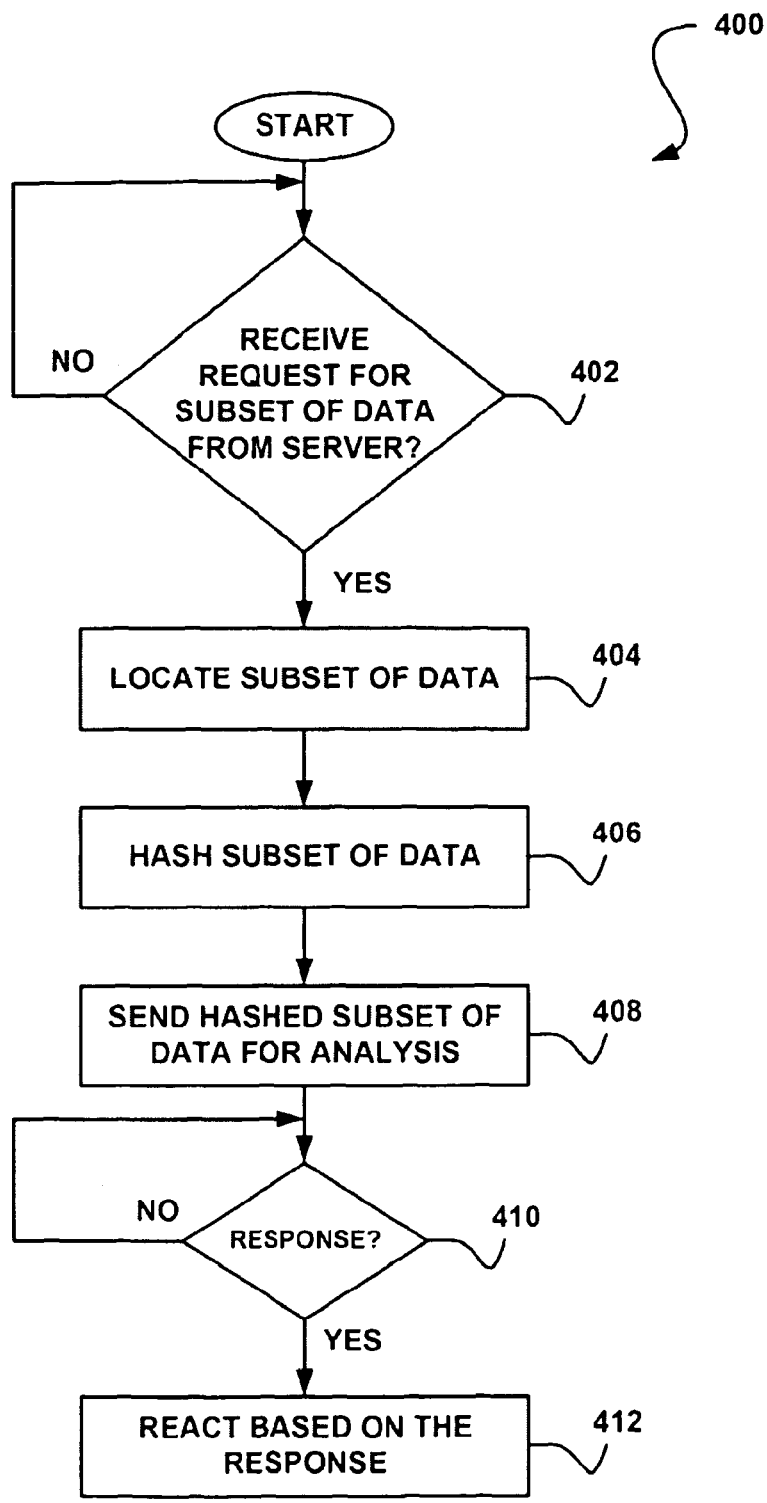
FIG. 4 shows a method for scanning data on a client using only a subset of the data, from the perspective of the client, in accordance with another embodiment.

In this case, the hashed data may include identification information. Thus, identification information stored in the data structure 300 may be utilized to identify the hashed data sent from the client to the server. It should be noted that, in various embodiments, the client may or may not hash data stored on the client FIG. 4 shows a method 400 for scanning data on a client using only a subset of the data, from the perspective of the client, in accordance with another embodiment. As an option, the method 400 may be implemented in the context of the architecture and environment of FIGS. 1-3. Of course, however, the method 400 may be carried out in any desired environment. Further, the aforementioned definitions may apply during the present description.

As shown, a client determines whether a request for a subset of data is received. See operation 402. If it is determined that a request for a subset of data is received, the subset of data is located. See operation 404.

As an option, the subset of data may then be hashed utilizing a hashing algorithm. See operation 406. A representation of the subset of data is then sent to a requesting server for analysis. See operation 408. In this case, the representation includes the hashed subset of data. In either case, the representation may be generated utilizing an agent application on the client or a virtual machine on the client.

It is then determined whether a response is received from the server. See operation 410. If a response is received from the server, the client reacts based on the response. See operation 412.

As an option, an update of the representation may be sent from the client to the server in response to the subset of data being modified on the client. In this case, the server may also respond to the update. Subsequently, the client may react based on that response.

Figure 5:
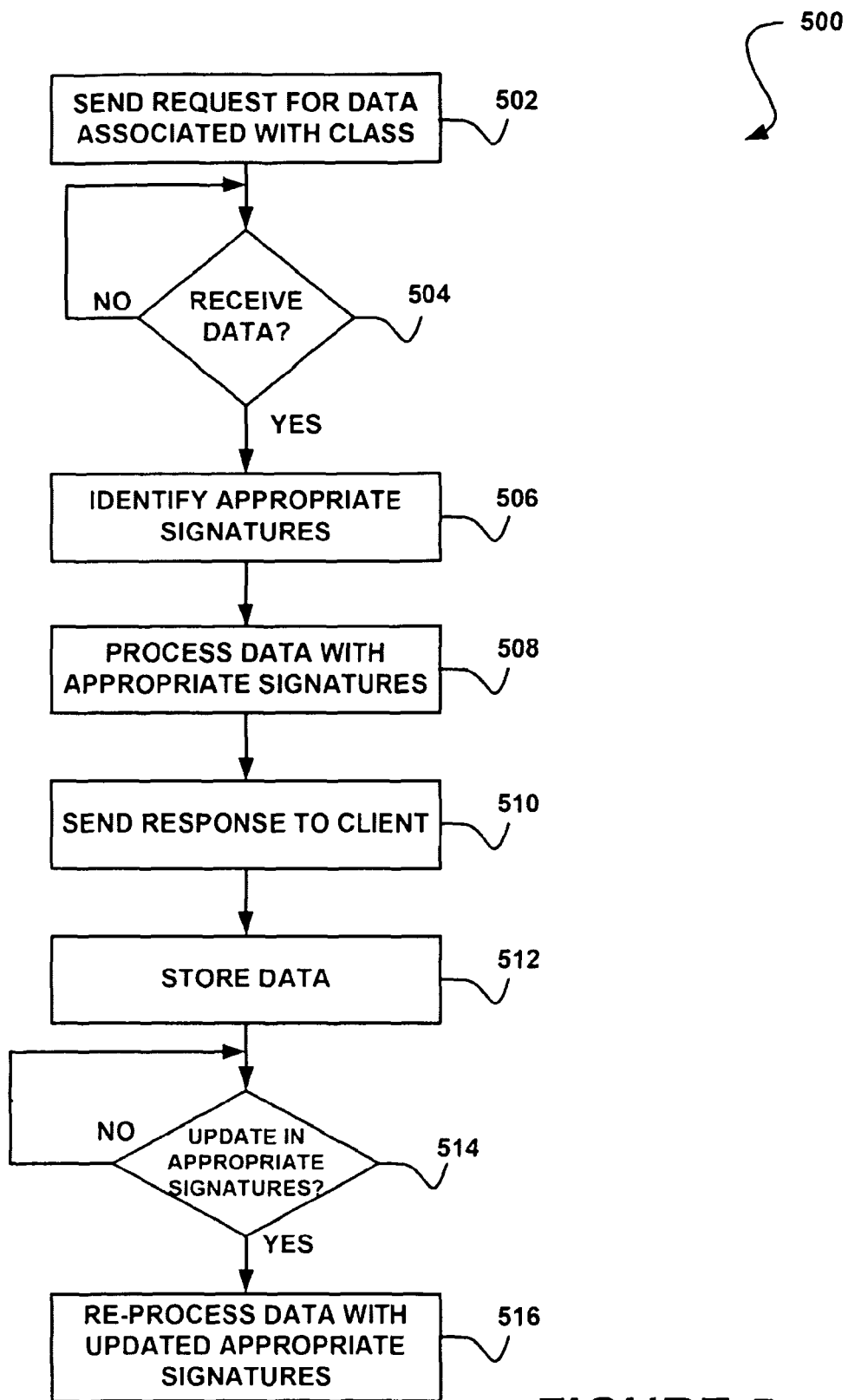
FIG. 5 shows a method for scanning data on a client using only a subset of the data, from the perspective of a server, in accordance with one embodiment.

FIG. 5 shows a method 500 for scanning data on a client using only a subset of the data, from the perspective of a server, in accordance with one embodiment. As an option, the method 500 may be implemented in the context of the architecture and environment of FIGS. 1-4. Of course, however, the method 500 may be carried out in any desired environment. Again, the aforementioned definitions may apply during the present description.

As shown, a request for a subset of data stored on a client that is required for determining whether the data is unwanted is sent. See operation 502. In this case, the subset of data may be associated with a class of data defined in a data structure stored on the server.

It is then determined whether a representation of only the subset of data is received from the client over a network. See operation 504. If the representation has been received, one or more appropriate signatures corresponding to the representation are identified. See operation 506.

In this case, the appropriate signatures may include a subset of signatures that are selected based on the representation. For example, the subset of signatures may be selected based on identification information included with the representation. This identification may identify a portion of the subset (e.g. a hashed potion, etc.) or the entire subset. As another option, the signatures may be classified into a plurality of classes with each class of signatures adapted for being compared against a different subset of data.

Once the appropriate signatures are identified, the representation is scanned/processed utilizing a plurality of the identified appropriate signatures. See operation 508. A response is then sent to the client over the network. See operation 510.

Additionally, the representation of the subset of data is stored. See operation 512. In one embodiment, the representation may be stored for a predetermined amount of time. While the representation is in storage, it is determined whether any of the signatures associated with the representation have been updated. See operation 514.

If the signatures have been updated, the representation is reprocessed with the updated signatures. See operation 516. Thus, the stored representation may be scanned at a first point in time utilizing a first set of signatures and the stored representation may be scanned at a second point in time utilizing a second set of signatures.

In this case, the second set of signatures may include an updated version of the first set of signatures. As an option, the second scan may occur automatically when the second updated signatures become available. As another option, subsequent scans may be performed periodically based on a user configurable predetermined scan time.

Figure 6:
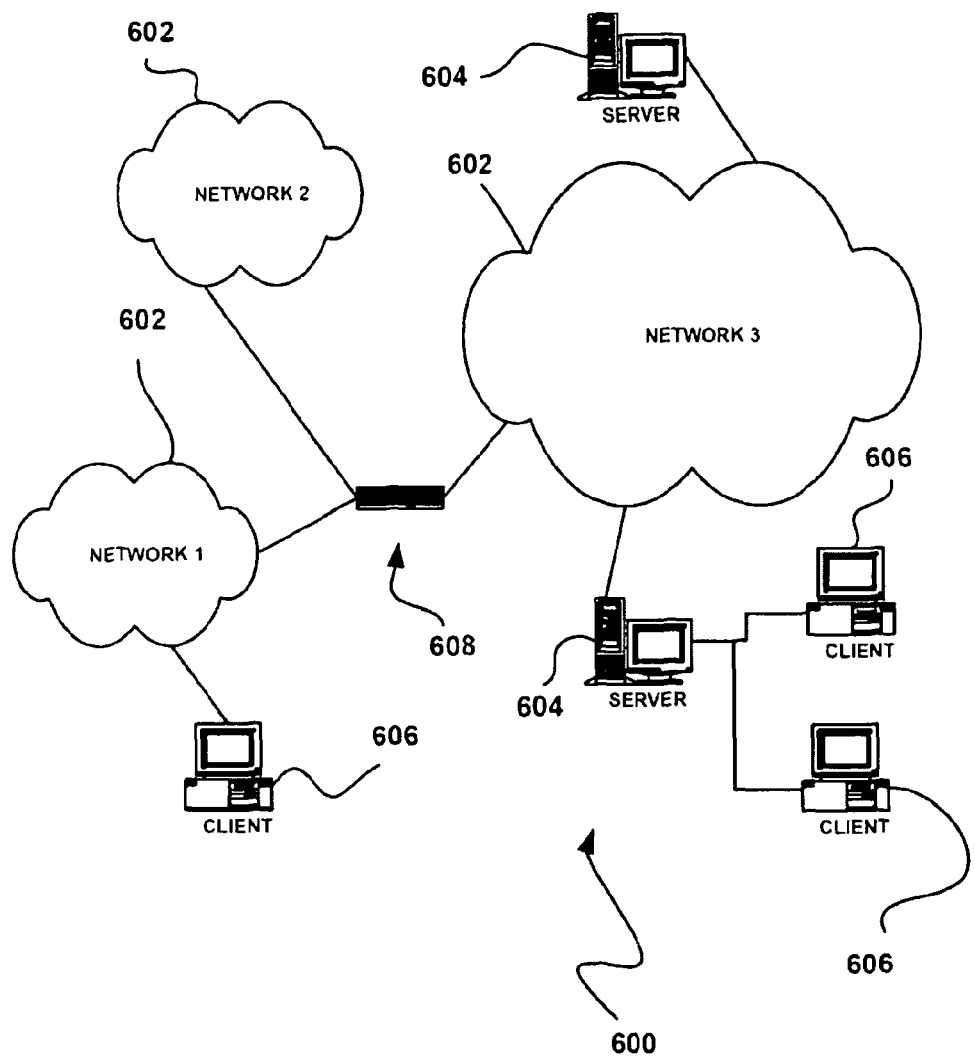
FIG. 6 illustrates a network architecture, in accordance with one embodiment.

FIG. 6 illustrates a network architecture 600 in which the various architecture and/or functionality of the various previous embodiments may be implemented. As shown, a plurality of networks 602 is provided. In the context of the present network architecture 600, the networks 602 may each take any form including, but not limited to a local area network, a wireless network, a wide area network such as the Internet, peer-to-peer network, etc.

Coupled to the networks 602 are servers 604 which are capable of communicating over the networks 602. Also coupled to the networks 602 and the servers 604 is a plurality of clients 606. Such servers 604 and/or clients 606 may each include a desktop computer, lap-top computer, hand-held computer, mobile phone, personal digital assistant, peripheral (e.g. printer, etc.), any component of a computer, and/or any other type of logic. In order to facilitate communication among the networks 602, at least one gateway 608 is optionally coupled therebetween.

Figure 7:
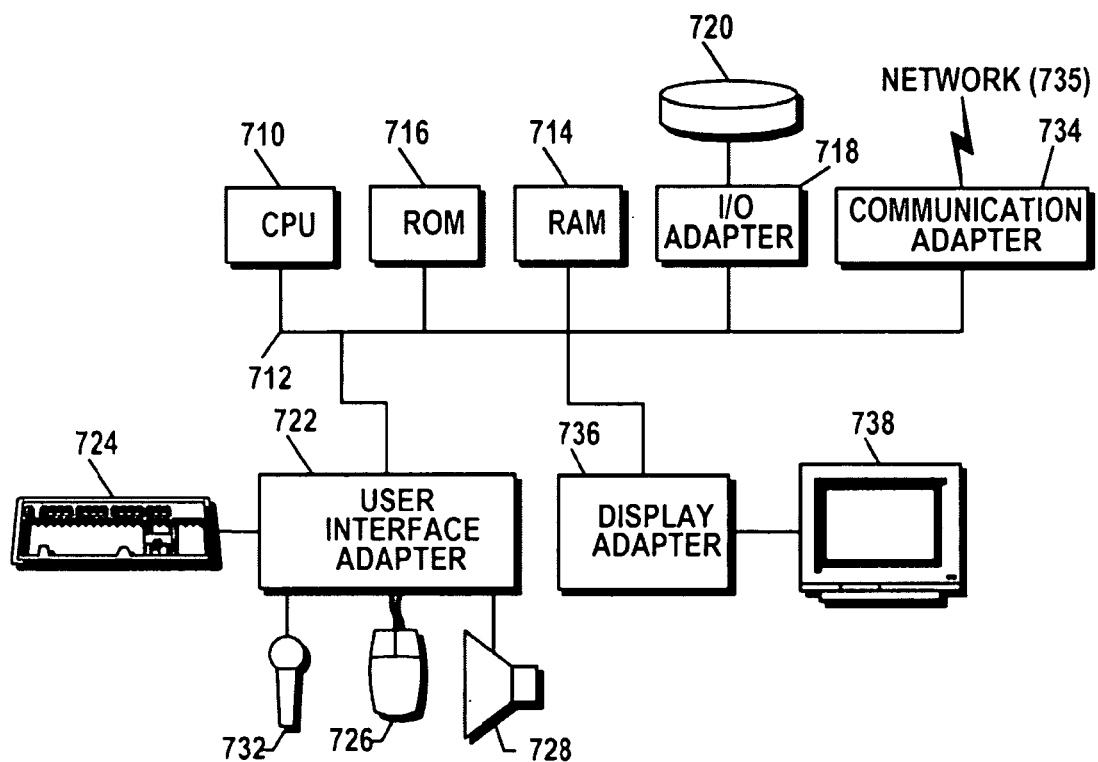
FIG. 7 shows a representative hardware environment that may be associated with the servers and/or clients of FIG. 6, in accordance with one embodiment.

FIG. 7 shows a representative hardware environment that may be associated with the servers 604 and/or clients 606 of FIG. 6, in accordance with one embodiment. Such figure illustrates a typical hardware configuration of a workstation in accordance with one embodiment having a central processing unit 710, such as a microprocessor, and a number of other units interconnected via a system bus 712.

The workstation shown in FIG. 7 includes a Random Access Memory (RAM) 714, Read Only Memory (ROM) 716, an I/O adapter 718 for connecting peripheral devices such as disk storage units 720 to the bus 712, a user interface adapter 722 for connecting a keyboard 724, a mouse 726, a speaker 728, a microphone 732, and/or other user interface devices such as a touch screen (not shown) to the bus 712, communication adapter 734 for connecting the workstation to a communication network 735 (e.g., a data processing network) and a display adapter 736 for connecting the bus 712 to a display device 738.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable storage medium, comprising:
    computer code to receive a request for a subset of data stored on a client, the request defining a plurality of classes, each of the plurality of classes including identification information and retrieval instructions that identify a signature;
    computer code to generate a representation of the subset of data in response to the request, wherein the representation of the subset of data includes the identification information of one of the plurality of classes and a hash of the subset of data;
    computer code to send the representation of the subset of data from the client to a server over a network;
    computer code to receive a response to the representation from the server over the network; and
    computer code to perform a reaction based on the response, the reaction including at least one of deleting the data, deleting an application associated with the data, restarting the application, or shutting down the client.

2. The computer program product of claim 1, wherein the computer code to send the representation of the subset of data sends the subset of data.

3. The computer program product of claim 1, further comprising
    computer code to send an update of the representation of the subset of data from the client to the server, in response to the subset of data being modified.

4. The computer program product of claim 1, wherein the representation of the subset of data is generated utilizing an agent application on the client.

5. The computer program product of claim 1, wherein the representation of the subset of data is generated utilizing a virtual machine on the client.

6. The computer program product of claim 1, wherein the client includes a mobile wireless device.

7. A method, comprising:
    receiving a request for a subset of data stored on a client, the request defining a plurality of classes, each of the plurality of classes including identification information and retrieval instructions that identify a signature;
    generating a representation of the subset of data in response to the request, wherein the representation of the subset of data includes the identification information of one of the plurality of classes and a hash of the subset of data;
    sending the representation of the subset of data from the client to a server over a network;
    receiving a response to the representation from the server over the network; and
    performing a reaction based on the response, the reaction including at least one of deleting the data, deleting an application associated with the data, restarting the application, or shutting down the client.

8. The method of claim 7, further comprising:
    disabling an I/O port, resetting the client, or installing an uninfected file or application associated with the data, based on the response.

9. The method of claim 7, further comprising:
    sending an update of the representation of the subset of data from the client to the server, in response to the subset of data being modified.

10. The method of claim 7, wherein the representation of the subset of data is generated utilizing an agent application on the client.

11. The method of claim 7, wherein the representation of the subset of data is generated utilizing a virtual machine on the client.

12. The method of claim 7, wherein the client includes a mobile wireless device.

13. A client, comprising:
    a communication adapter configured to receive a request for a subset of data stored on the client, the request defining a plurality of classes, each of the plurality of classes including identification information and retrieval instructions that identify a signature; and
    a processing unit configured to generate a representation of the subset of data in response to the request, wherein the representation of the subset of data includes the identification information of one of the plurality of classes and a hash of the subset of data,
    the communication adapter is configured to send the representation of the subset of data from the client to a server over a network and to receive a response to the representation from the server over the network, and
    the processing unit is configured to perform a reaction based on the response, the reaction including at least one of deleting the data, deleting an application associated with the data, restarting the application, or shutting down the client.

14. The client of claim 13, wherein the communication adapter is configured to send an update of the representation of the subset of data from the client to the server, in response to the subset of data being modified.

15. The client of claim 13, wherein the representation of the subset of data is generated utilizing an agent application on the client.

16. The client of claim 13, wherein the representation of the subset of data is generated utilizing a virtual machine on the client.

17. The client of claim 16, wherein the virtual machine is a Java virtual machine configured to send the representation of the subset of data to the server.

18. The client of claim 13, wherein the client includes a mobile wireless device.

\* \* \* \* \*

UNITED STATES PATENT AND TRADEMARK OFFICE
CERTIFICATE OF CORRECTION

PATENT NO. : 9,544,360 B2  Page 1 of 1
APPLICATION NO. : 14/337421
DATED : January 10, 2017
INVENTOR(S) : Khai N. Pham It is certified that error appears in the above-identified patent and that said Letters Patent is hereby corrected as shown below:

On the Title Page

In item (63), in Column 1, in "Related U.S. Application Data", Line 1, delete "Continuation" and insert -- Divisional --, therefor.

Signed and Sealed this
Twenty-first Day of March, 2017

Michelle K. Lee
*Director of the United States Patent and Trademark Office*